United States Patent [19]

Hirota et al.

[11] Patent Number: 4,674,516

[45] Date of Patent: Jun. 23, 1987

[54] ULTRASONIC DELAY LINE MATRIX SWITCH CHECK SYSTEM

[75] Inventors: Yuichi Hirota; Toshikatsu Kodama; Hideya Akasaka; Yasuhito Takeuchi, all of Tokyo, Japan

[73] Assignee: Yokogawa Medical Systems, Limited, Tokyo, Japan

[21] Appl. No.: 767,270

[22] PCT Filed: Dec. 6, 1984

[86] PCT No.: PCT/JP84/00579

§ 371 Date: Jul. 26, 1985

§ 102(e) Date: Jul. 26, 1985

[87] PCT Pub. No.: WO85/02531

PCT Pub. Date: Jun. 20, 1985

[30] Foreign Application Priority Data

Dec. 16, 1983 [JP] Japan ............................. 58-238214

[51] Int. Cl.⁴ ............................................. A61B 10/00
[52] U.S. Cl. ......................................... 128/660; 73/626
[58] Field of Search ............................... 128/660–663; 73/625–626

[56] References Cited

U.S. PATENT DOCUMENTS

| 4,373,323 | 2/1983 | Takemura et al. | 128/660 |
| 4,423,737 | 1/1984 | Yano et al. | 128/661 |
| 4,528,854 | 7/1985 | Shimazahi | 128/660 X |
| 4,544,926 | 11/1985 | Shirasaha | 128/663 |

Primary Examiner—Kyle L. Howell
Assistant Examiner—Franics J. Jaworski
Attorney, Agent, or Firm—Moonray Kojima

[57] ABSTRACT

The equipment in this invention provides an ultrasound diagnostic equipment with a matrix switch checking means configured in a combined use with means commonly furnished to said device heaving a built-in test sequencer, whereby taps on the delay line is selected in due order from one end of said taps for each channel of the matrix switch to input a checking signal to that channel from a transducer circuit every time these taps are selected; as a result a signal obtained from the delay-line output terminals is shown on a display screen of a display device as a mimic echo signal to determine the presence or absence of any fault of switching elements in the relevant channel of the matrix switch based on a mimic echo image pattern shown on the display screen.

5 Claims, 9 Drawing Figures

ULTRASONIC DELAY LINE MATRIX SWITCH CHECK SYSTEM

TECHNICAL FIELD

This invention relates to an ultrasound diagnostic equipment with a matrix switch checking means.

BACKGROUND ART

In an ultrasound diagnostic equipment, a delay line with more than one tap is used. Thus, a signal received by each transducer is supplied to the specified tap on the delay line to output the synthesized receive signal obtained by adding each signal having the respective specified delay time from one end of this delay line. Delay time of each signal is changed by delay-line tap selection to change the received wave beam direction and focus. Delay-line tap selection is made using a matrix switch to enable any one of the received signals to connect to any one of the taps.

As aforementioned, the matrix switch becomes the principal part of the ultrasound diagnostic equipment. On the other hand, the matrix switch is provided with several thousand switching elements.

So far, this matrix switch has been checked by means of a complex checking device as disclosed in Japanese Patent Provisional Publication No. 44364/82. Thus, the matrix switch has been checked only by the use of a special checking device.

DISCLOSURE OF THE INVENTION

The purpose of this invention is to provide an ultrasound diagnostic equipment with a matrix switch checking means configured in a combined use with means commonly furnished to said equipment, thus removing the aforementioned disadvantage.

For the accomplishment of this purpose, the device in this invention has a built-in test sequencer, whereby taps on the delay line are selected in order from one end of said taps for each channel of the matrix switch to input a checking signal to that channel from an ultrasound transducer drive circuit each time the taps are selected; as a result a signal obtained from the delay-line output terminals is shown on a display screen of a display device as a mimic echo signal to determine the presence or absence of any fault of switching elements in the relevant channel of the matrix switch based on a mimic echo image pattern shown on the display device.

BEST MODE FOR CARRYING OUT THE INVENTION

Figure 1:
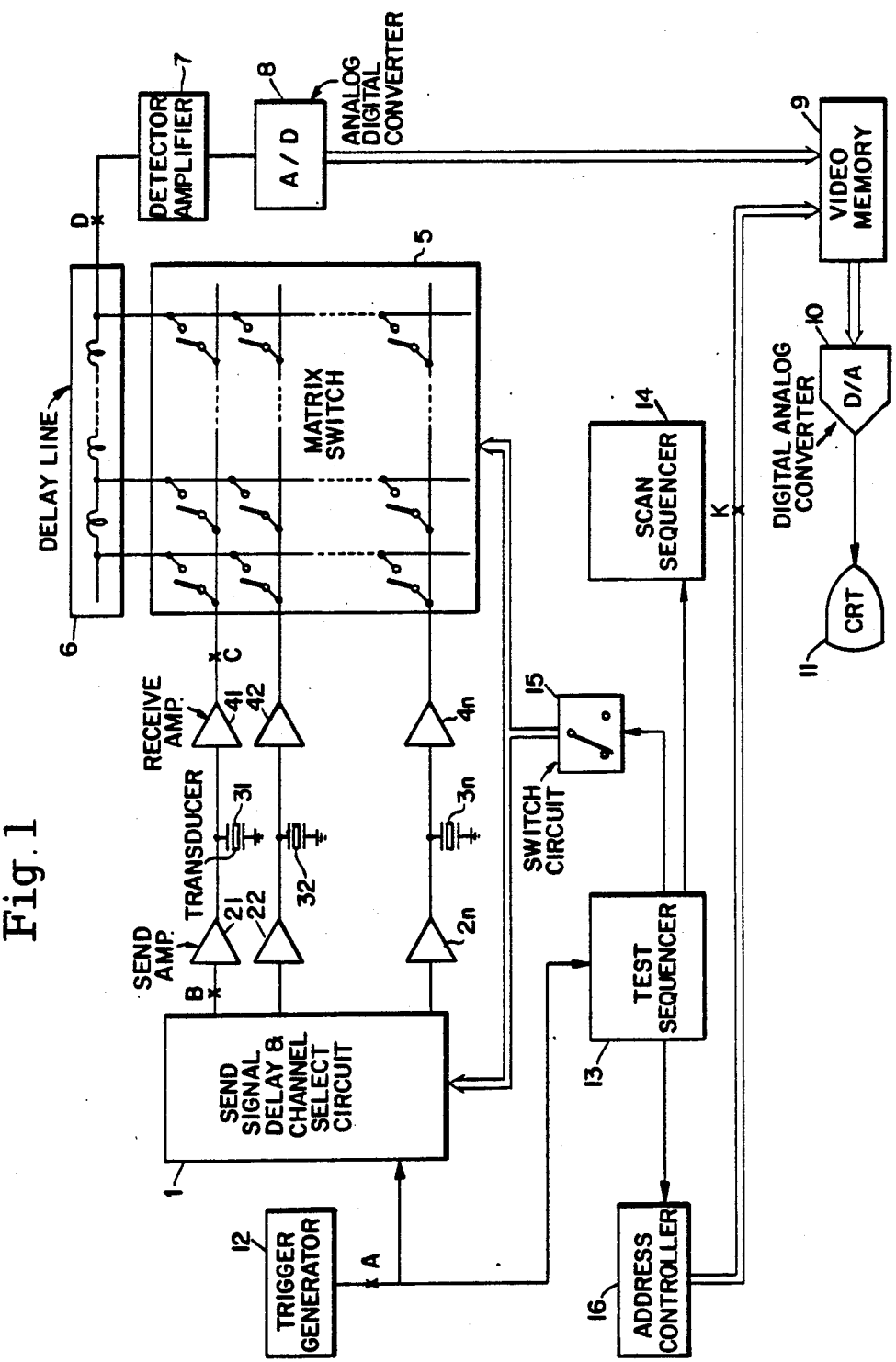
FIG. 1 shows a block diagram showing the configuration of the embodiment of this invention.

In the following, the embodiment in this invention is described by referring to the figures in the drawing.

Referring to FIG. 1, the equipment in this invention consists of a send signal delay & channel select circuit 1, send amplifiers 21 to 2n, transducers 31 to 3n, receive amplifiers 41 to 4n, matrix switch 5, delay line with taps 6, detector amplifier 7, analog-to-digital converter (hereinafter called A/D converter) 8, video memory 9, digital-to-analog converter (hereinafter called D/A converter) 10, image display device (hereinafter called CRT) 11, trigger generator 12, test sequencer 13, scan sequencer 14, switch circuit 15, and address controller 16.

One of output pulses from the trigger generator 12 is fed to the send signal delay & channel select circuit 1 as an input signal. Each of the outputs (n in number) of the send signal delay & channel select circuit 1 connects to each of the inputs (n in number) of the send amplifiers 21 to 2n, while each of the outputs (n in number) of the send amplifiers 21 to 2n connects to each of the inputs (n in number) of the receive amplifiers 41 to 4n. On the other hand, each of the outputs (n in number) of the receive amplifiers 41 to 4n connects to each of the receive signal input lines (n in number) of the matrix switch 5, while each of the output lines (n in number) connects to each of the taps (n in number) of the delay line 6.

A switching element is installed at each cross point between the input and output lines of the matrix switch 5. The output of the delay line 6 connects to the input of the detector amplifier 7, while the output of the detector amplifier 7 connects to the input of the A/D converter 8. The output of the A/D converter 8 connects to the image signal input of the video memory 9, while the output of the video memory 9 connects to the input of the D/A converter 10, and then the output of the D/A converter 10 connects to the input of the CRT 11.

Further, the output of the trigger generator 12 connects to the input of the test sequencer 13, while the first output of the test sequencer connects to the input of the address controller 16, and then the output of the address controller 16 connects to the address input of the video memory 9. In addition, the second output of the test sequencer 13 connects to the input of the scan sequencer 14; the third output of the test sequencer 13 connects to the first input of the switch circuit 15; and the fourth output of said sequencer connects to the second input of the switch circuit 15. The output of the scan sequencer 14 connects to the third input of the switch circuit 15. The output of the switch circuit connects to the control signal input of the send signal delay & channel select circuit 1 and also to the control signal input of the matrix switch 5. The test sequencer 13 and the scan sequencer 14 are each made up of a microprocessor, etc. The test sequencer 13, scan sequencer 14 and the switch circuit 15 may also have the functions attained in a common microprocessor.

Figure 9:
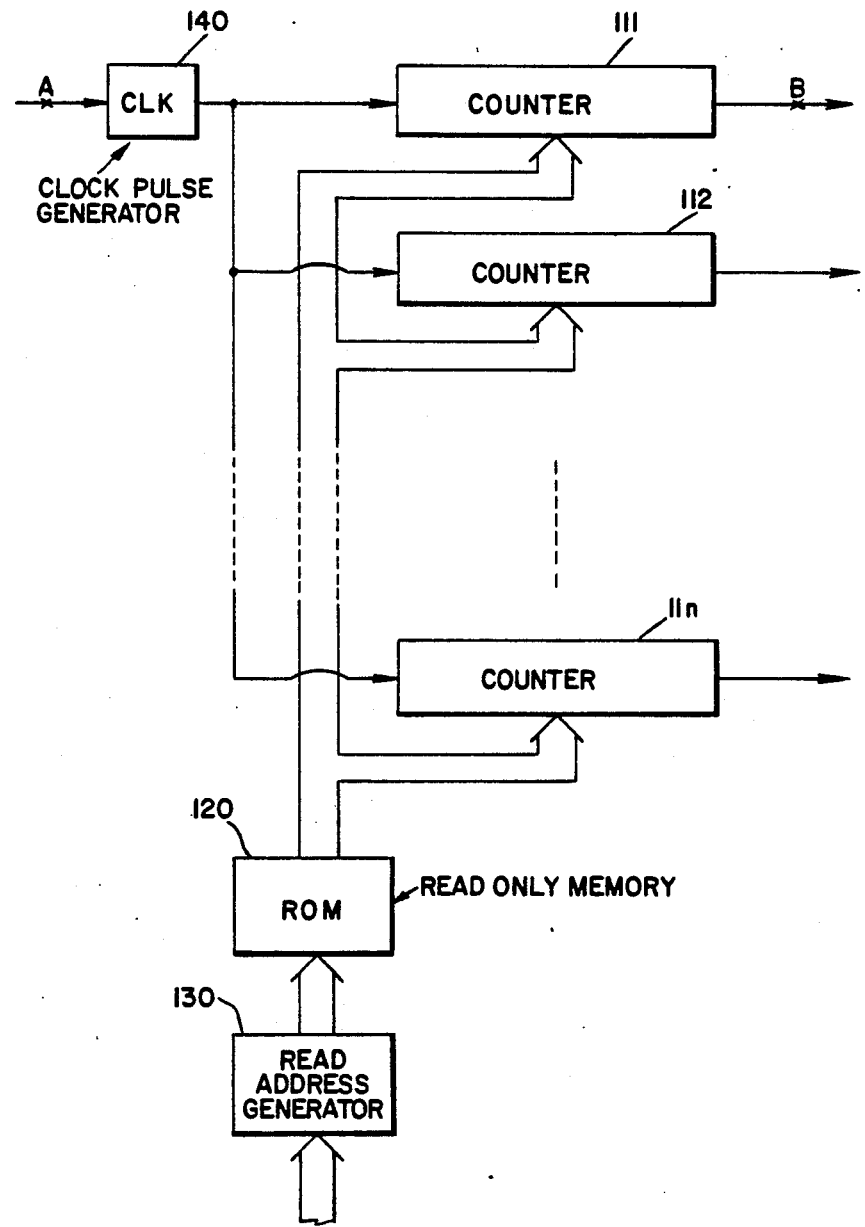
FIG. 9 shows a block diagram showing the detailed configuration of the send signal delay and channel select circuit.

FIG. 9 shows the detailed configuration of the send signal delay & channel select circuit 1.

Referring to FIG. 9, counters 111 to 11n are installed corresponding to the transducers 31 to 3n and a delay time set value and a chip select signal read from a read only memory 120 are fed to each of said counters.

The delay time set value and chip select signal are stored in the read only memory 120 beforehand according to the ultrasound beam direction and focus. The read only memory 120 is read in accordance with the address output from a read address generator 130. The address output from the read address generator 130 is controlled by the control signal of the test sequencer 13 or scan sequencer fed via the switch circuit 15.

A clock pulse generator 140 is started by a trigger pulse fed from the trigger generator 12 to generate a clock pulse in a cycle much shorter than the repetition cycle of the trigger pulse, thus feeding this clock pulse to each of the counters 111 to 11n. Any counter enabled by the chip select signal among the counters 111 to 11n counts down the delay time according to the clock pulse to generate an output pulse when its counted value becomes 0. Thus, from any of the specified counters among the counters 111 to 11n, the output pulse with the delay time preset to the counter is generated.

In such above configuration, the connection of the output of the scan sequencer 14, excepting the outputs of the test sequencer 13 and the switch circuit 15, to the control signal inputs of the send delay & channel select circuit 1 and the matrix switch 5 is a configuration commonly provided to an ultrasound diagnostic equipment of this type.

The unique art of this invention is that the test sequencer 13 and the switch circuit 15 are added to the configuration of a conventional ultrasound diagnostic equipment and the output of the test sequencer 13 connects to the control inputs of the send signal delay & channel select circuit 1 and matrix switch 5 via the switch circuit 15 to enable checking of the matrix switch 5 undermentioned using the test sequencer 13.

In the normal mode, the output signal of the scan sequencer 14 connects to the control signal inputs of the send signal delay & channel select circuit 1 and matrix switch 5 through the selection of the switch circuit 15. Thus, the send signal delay & channel select circuit 1 performs ultrasound send beam forming under the control of the scan sequencer 14, while the matrix switch 5 and the delay line 6 perform ultrasound receive beam forming.

The echo signal thus obtained on the output terminals of delay line 6 is detected and amplified by the detector amplifier 7 to be stored in the video memory 9 under the control of the address controller 16 after its digital conversion by the A/D converter 8.

The echo signal stored in the video memory 9 is read synchronizing with the display operation of the CRT 11, thus being displayed as an image on the CRT after analog brightness signal conversion by the D/A converter.

Following is the description of the operation of the embodiment of this invention in the matrix switch check mode.

In the matrix switch check mode, the transducers 31 to 3n do not contact with a measured body.

Figure 2:
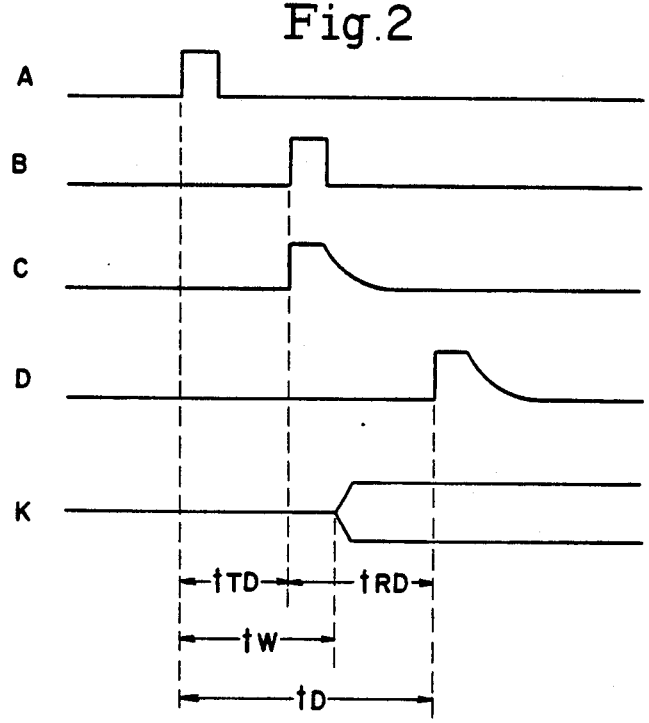
FIG. 2 shows waveform diagrams showing signal waveforms at the respective portions in FIG. 1.

A, B, C, D and K in FIG. 2 correspond to waveforms at A, B, C, D and K marked with X in FIG. 1.

The switch circuit 15 is selected by the control signal fed to the switch circuit 15 from the test sequencer 13, configuring the connection corresponding to the check mode. Thus, the control signal of the test sequencer 13 controls the send signal delay & channel select circuit 1 and matrix switch 5. In this check mode, the test sequencer 13 also controls said address controller.

First, the send signal delay & channel select circuit 1 and matrix switch 5, in the first channel related to the first transducer, is so controlled that the amount of send signal delay $TD$ in the send signal delay & channel select circuit 1 becomes maximum, while the amount of receive signal delay $RD$ in the matrix switch 5 becomes minimum.

The minimum amount of receive signal delay $RD$ is set by closing one of the switch elements at the extreme right in the first channel of the matrix switch 5.

Under this condition, if said trigger generator generates a trigger pulse A in the same way as the conventional ultrasound diagnostic equipment, the send signal delay & channel select circuit 1 outputs a send signal trigger pulse B with the delay time corresponding to the amount of delay $t_{TD}$. This send signal trigger pulse B is fed to the receive amplifier 41 to output a saturated pulse C from the receive amplifier 41.

This output C is input to the delay line 6 via the switching element in the position giving the minimum amount of receive signal delay $RD$ in the matrix switch 5 to output a saturated receive signal D from the delay line 6. This saturated receive signal D is detected by the detector amplifier 7, and then is converted to the digital signal by the A/D converter 8 to be stored in the video memory 9 by the address signal K from the address controller 16. Thus, the receive signal D is stored in the video memory as if it were one echo. The sum $D$ of the amount of send signal delay $TD$ and the amount of recieve signal delay $RD$ determines "Echo" depth.

Next, in the same first channel, the amount of send signal delay $TD$ decreases by one step, while the amount of receive signal delay $RD$ increases by one step to perform the same operation as that aforementioned by the next trigger pulse, thus storing the "Echo" signal to the next of the previous echo in the video memory 9.

One increment of the amount of receive signal delay $RD$ is made by closing instead the switching element on the immediate left-side of the switching element so far closed in the first channel of the matrix switch 5.

In this case, the total amount of delay $RD$ which is the sum of the amount of send signal delay $TD$ and that of receive signal delay $RD$ is kept constant. A similar operation is repeatedly performed until the amount of receive signal delay $RD$ becomes maximum in the first channel.

Thus, all of the switching elements in the first channel of the matrix switch 5 are closed one by one from the end in due order to store an "echo" image passed through the relevant switching element closed in the video image in due order.

One switching element among the switching elemets in the matrix switch 5 is closed by one trigger pulse in the same way as the conventional ultrasound diagnostic equipment. Therefore, all of the switching elements in one channel are scanned at very high-speed.

Figure 3:
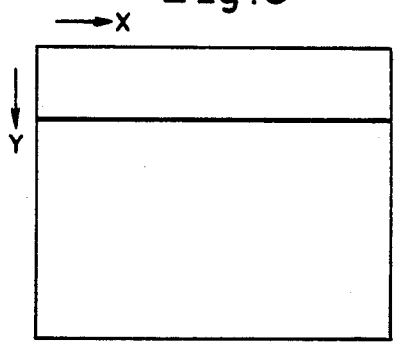
FIG. 3, 4, 5 and 6 show examples of displays on CRT as test results.

If the "echo" image in the video memory 9 is shown on the CRT 11, as far as the switching elements in the matrix switch 5 are normal and no disconnection of the delay line 6 exists, a bright line with constant brightness is shown in the direction parallel with the X-axis by the saturated receive signal D with the constant amount of delay as shown in FIG. 3.

Figure 4:
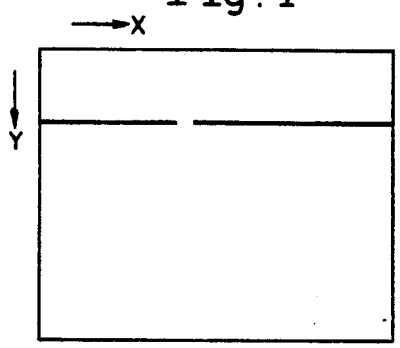

However, if there is any fault whereunder one switching element in the matrix switch 5 does not close, the output C of the receive amplifier 4 is so blocked by that faulty switching element that the output of the receive amplifier 4 corresponding to that element is not displayed; namely a break of the bright line occurs as shown in FIG. 4. The location of this break corresponds to the position of the faulty switching element.

Figure 5:
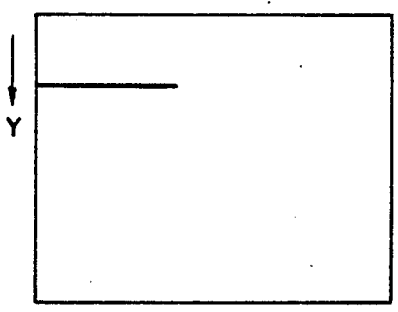

Further, if there is the disconnection of the delay line 6, bright line display is broken at some part of the line as shown in FIG. 5, causing shorter bright line length. The location of the broken bright line corresponds to the position of disconnection of the delay line 6.

Figure 6:
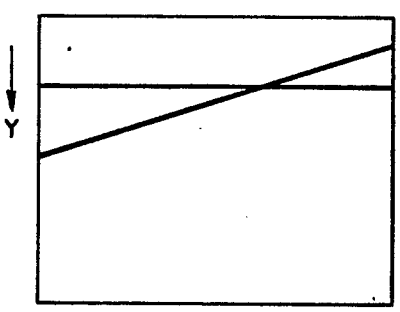
Figure 7:
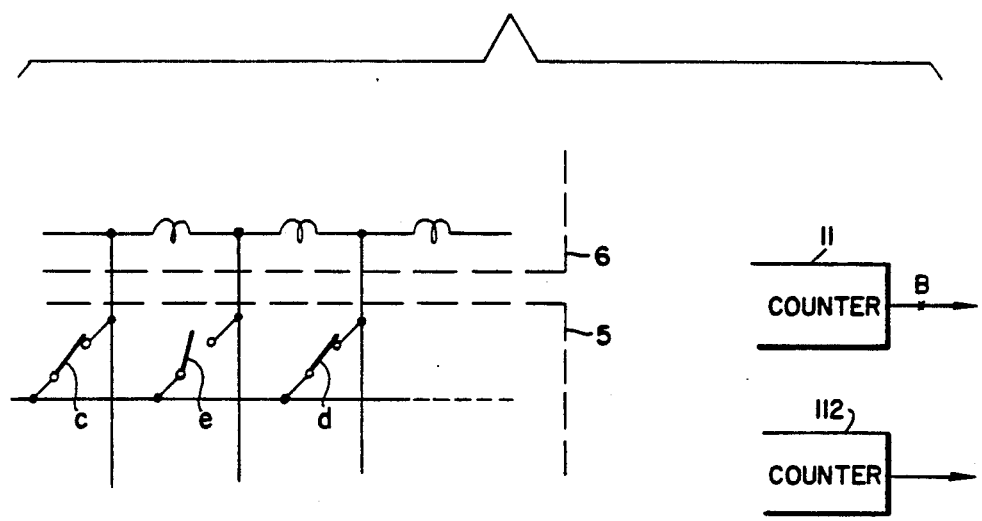
FIG. 7 shows a circuit diagram wherein one switching element of the matrix switch continues closing due to its fault.
Figure 8:
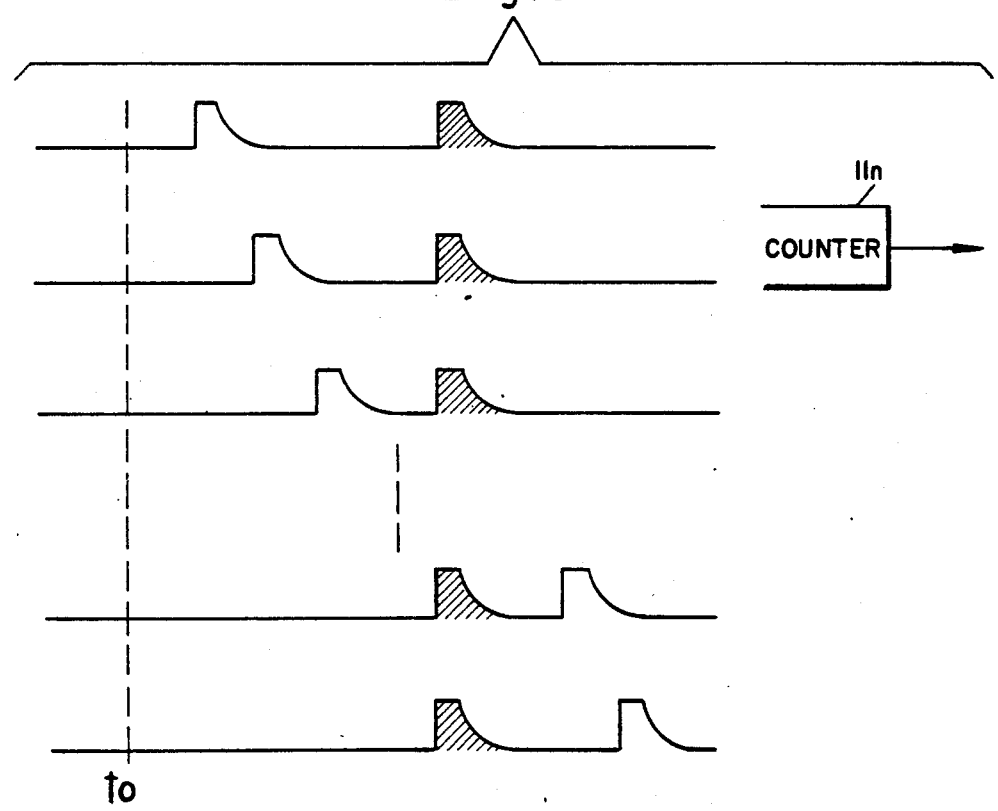
FIG. 8 shows waveform diagrams of pulse waveforms generated under the fault occurring when one switching element of the matrix switch continues closing.

In addition, as shown in FIG. 7, if any fault occurs wherein one switching element among the switching elements in the matrix switch 5 keeps closing, two saturated receive signals D with time difference are output from the delay line 6. Thus, the CRT 11 shows a display with two bright line crossed each other as shown in FIG. 6. The reason, as shown in FIG. 8, is that when the amount of receive signal delay $\tau_{RD}$ is increased from its minimum value, pulses subjected to receive signal delay via the faulty switch c; namely pulses with slant lines in the same Figure are always output with the constant time delay with respect to the timing $t_0$ of generating the output C of the receive amplifier 41, while pulses subjected to receive signal delay via the switches e,d, ..., under normal operation; namely those without slant lines in FIG. 8 are output with sequentially increasing time delays with respect to the timing $t_0$. The delay time $t_{TD}$ sequentially decreasing from the maximum value obtained in the send signal delay & channel select circuit 1 is added to these delay times which give the respective "echo" depths. Therefore, the display of the pulses passed through the faulty switching element on the CRT 11 becomes aslant with respect to that of the pulses passed through the normal switching elements.

The cross-point of these bright lines corresponds to the location of the faulty switching element.

Thus, since the CRT 11 displays the peculiar bright line patterns according to the presence or absence of faults of the switching elements in the matrix switch 5 and the disconnection of the delay line, the faults of the matrix switch and delay line 6 including their locations are easily discriminated from these display patterns.

After the end of checking the first channel, the same check is conducted to the second channel of the matrix switch 5, and then to the next channel in due order. Since only a short period of time is required for checking per channel, not much time is required for the check of all the switching elements in the matrix switch 5.

In the embodiment of this invention, according to the amount of receive signal delay change, the amount of send signal delay is also changed to keep the sum of the amount of send signal delay and that of receive signal delay constant. However, even in case the total amount of delay is changed while the amount of send signal delay is kept constant, the equipment in this invention can be embodied.

For example, assuming that said sum changes in a linear equation, bright line display is aslant with respect to the X-axis, which becomes a normal pattern.

Further in the embodiment of this invention, the initial amount of send signal delay $\tau_{TD}$ is set to the maximum value, while that of receive signal delay $\tau_{RD}$, to the minimum value. However, the equipment in this invention can be embodied even in the reverse relationship.

In the embodiment of this invention, it is desirable that the receive amplifier 4 not be extremely saturated by lessening send pulse power through the control of the send amplifier 2.

CAPABILITY OF EXPLOITATION IN INDUSTRY

The equipment in this invention can specify the fault locations of the matrix switch and delay line with taps in the ultrasound diagnostic equipment.

In addition, the matrix switch with several thousand switching elements can be checked within a short period of time by a checking means configured in a combined use with means commonly furnished to said equipment.

Further, the operator of said device can easily perform checking.

We claim:

1. An ultrasound diagnostic and self-test system comprising a plurality of transducer means for converting electrical signals to ultrasonic signals for sending into an object for diagnosis of said object and for converting received reradiated ultrasonic signals to electrical signals, each transducer means corresponding to a respective channel;

a trigger generator means for generating trigger pulses in specified cycles;

drive means operated by said trigger pulses for generating drive signals having variable delay times to drive said plurality of transducer means;

a plurality of receive amplifiers having input and output terminals, each amplifier being connected by its input terminal to a respective one of said plurality of transducer means;

a delay line having a plurality of taps located at specified intervals and transmitting output signals having specified delays;

a matrix switch comprising a plurality of lines, a plurality of columns, and a plurality of switching elements, each connecting the lines and columns at the intersections of respective lines and columns, each line being connected to a respective output terminal of each of said plurality of receive amplifiers, whereby each transducer means is connected to a respective line, with said lines being designated as said respective channels, and each column being connected to a respective tap on said delay line;

image display means connected to said delay line for displaying images based on said output signal of said delay line;

scan sequence means for applying control signals to said drive means and to said matrix switch to control the scanning sequence of said drive means and to control said matrix switch and thereby enable said drive means, said transducer means, said receive amplifiers, said matrix switch and said delay line, to send and receive beam forming signals for ultrasonic diagnosis of said object; and means for checking the matrix switch for faults, comprising a test sequencer and switching circuit, said test sequencer and said switch circuit being connected to said drive means, said scanner sequencer means, said matrix switch and said trigger generator, whereby in a check mode one of said transducer means in a first channel being checked is in a non-imaging state;

said switching circuit alternatively connecting said test sequencer and said scan sequencer to said drive means and said matrix switch, with said trigger generator applying pulses to said test sequencer, and address controller means for coordinating the time cycles in said display means, so that in a first step, in the first channel being checked, a first switching element is closed in said matrix switch in the line corresponding to the first channel and in a column that would produce maximum send signal delay and a minimum receive signal delay for signals from said drive means through said matrix switch and delay line and return, and in subsequent sequential steps, in the first channel, a second and subsequent switching elements are sequentially closed in said matrix switch in the line corresponding to the first channel and in next adjacent columns that would produce stepwise lesser than maximum send signal delays and stepwise more than minimum receive signal delays for each subsequent switching element that is closed.

2. The system as claimed in claim 1, wherein said test sequencer means comprises means for generating control signal to control the sequential closure of one switching element at a time due to the closure of one switching element starting from the switching element located at the cross-point between the output line of said matrix switch means connected to the tap nearest to the output end of said delay line and one input line of said matrix means down to the switching element located at the cross-point between the output line of the matrix switch means connected to the tap farthest from the output end of said delay line and one input line of said matrix switch means.

3. The system as claimed in claim 1, wherein said test sequencer means comprises means for generating control signal to control the sequential closure of each switching element due to the closure of one switching element at a time starting from the switching element located at the cross-point between the output line of said matrix switch means connected to the tap farthest to the output end of said delay line and one input line of said matrix means up to the switching element located at the cross-point between the output line of the matrix switch means connected to the tap nearest from the output end of said delay line and one input line of said matrix switch means.

4. The system as claimed in claim 1, wherein said test sequencer means comprises means for generating control signal whereby the delay times of drive signals generated by said drive means are changed so as to compensate delay time change in said delay line caused by the switching control of said matrix means.

5. The system as claimed in claim 1, wherein said image display means includes a video memory to store the video signals based on the output signals of said delay line.

* * * * *